(12) United States Patent
Jansen et al.

(10) Patent No.: US 11,264,189 B1
(45) Date of Patent: Mar. 1, 2022

(54) ELECTRICAL DEVICE HOUSING WITH PROTRUSIONS TO MAINTAIN A CONSISTENT GAP BETWEEN A FLOATING MECHANICAL ACTUATOR AND HOUSING APERTURE

(71) Applicant: Leviton Manufacturing Co., Inc., Melville, NY (US)

(72) Inventors: Ronald Jansen, Ridgewood, NY (US); Michael Kamor, North Massapequa, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 17/072,399

(22) Filed: Oct. 16, 2020

(51) Int. Cl.
| | | |
|---|---|---|
| *H01H 23/14* | (2006.01) | |
| *H01H 13/705* | (2006.01) | |
| *H01H 23/04* | (2006.01) | |
| *H02G 3/14* | (2006.01) | |
| *H01H 23/16* | (2006.01) | |
| *H01H 13/86* | (2006.01) | |

(52) U.S. Cl.
CPC ........ *H01H 23/145* (2013.01); *H01H 13/705* (2013.01); *H01H 13/86* (2013.01); *H01H 23/04* (2013.01); *H01H 23/16* (2013.01); *H02G 3/14* (2013.01); *H01H 2221/018* (2013.01)

(58) Field of Classification Search
CPC .............................. H02G 3/14; H01H 13/705
See application file for complete search history.

(56) References Cited

U.S. PATENT DOCUMENTS

| | | | |
|---|---|---|---|
| 8,138,435 B2 | 3/2012 | Patel et al. | |
| 8,459,812 B2 | 6/2013 | Wu et al. | |
| 8,592,681 B2 | 11/2013 | Alderson et al. | |
| 8,822,859 B2 | 9/2014 | Hoffman et al. | |
| 9,082,569 B2 | 7/2015 | Alderson et al. | |
| 9,978,547 B1* | 5/2018 | Wisniewski | ........... H01H 23/04 |
| 10,475,596 B2* | 11/2019 | Dimberg | .................. H01H 3/02 |

OTHER PUBLICATIONS

Author Unknown., "Getting Started Guide, decora smart 4-button controller" Leviton Mfg. Co,. Inc. 2019, 16 pages.

* cited by examiner

*Primary Examiner* — Vanessa Girardi
(74) *Attorney, Agent, or Firm* — Kacvinsky Daisak Bluni, PLLC

(57) ABSTRACT

An electrical load control device such as, for example, an electrical switch is disclosed. In use, the electrical device includes a manual switch or mechanical actuator positioned with an opening or aperture of a front cover of the device, the manual switch or actuator being arranged and configured to manipulate a connected load. The electrical device includes one or more geometries, surface features, or spacers arranged and configured within the aperture of the front cover. During use, the geometries, surfaces features, or spacers are arranged and configured to interact with the manual switch or actuator to reposition and/or align the switch or actuator within the aperture so that a consistent and uniform gap or spacing is maintained between the outer perimeter of the switch or actuator and the inner surface of the aperture. In one embodiment, the geometries, surfaces features, or spacers may be positioned within one or more of the corners of the aperture.

16 Claims, 16 Drawing Sheets

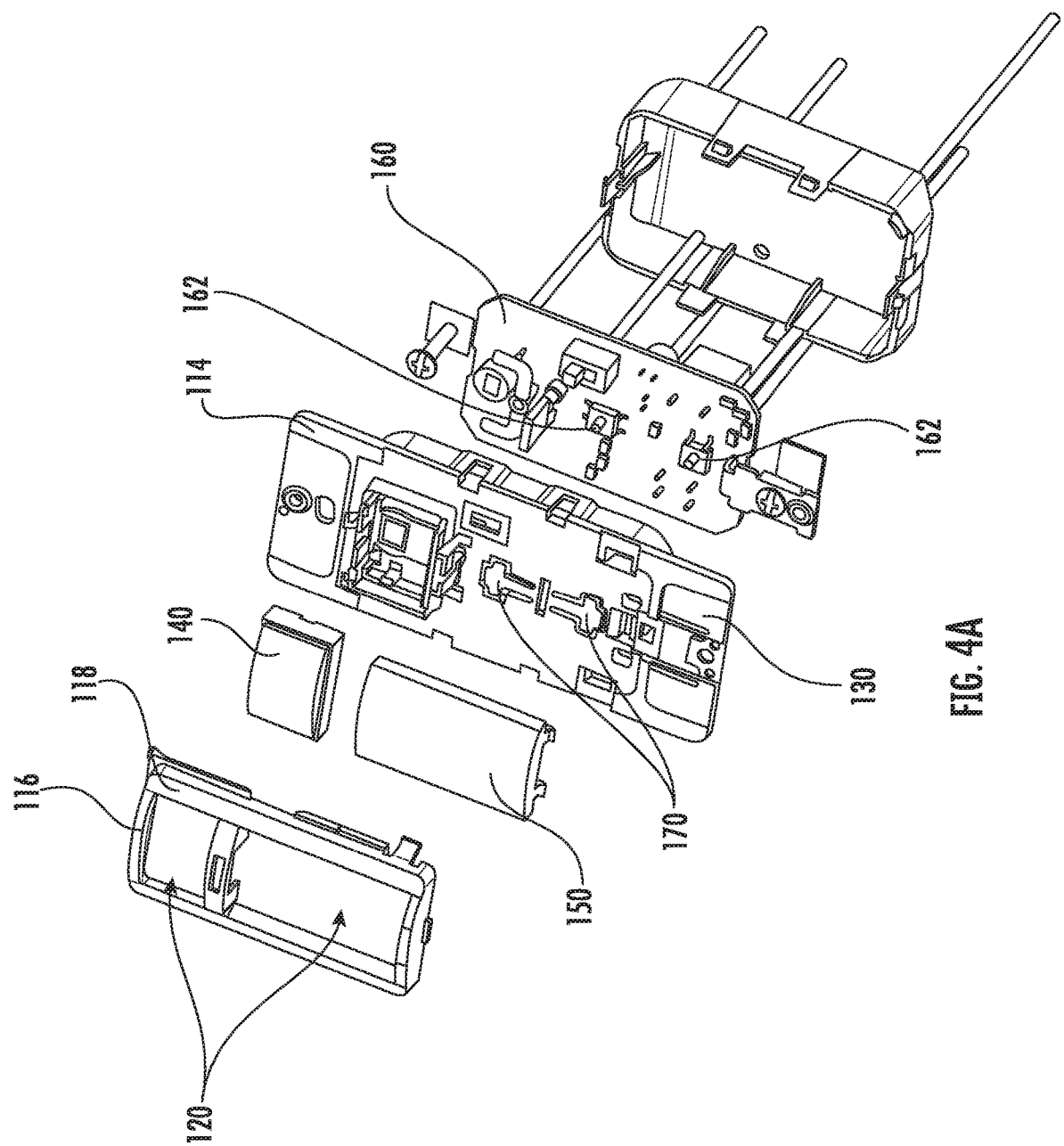

ELECTRICAL DEVICE HOUSING WITH PROTRUSIONS TO MAINTAIN A CONSISTENT GAP BETWEEN A FLOATING MECHANICAL ACTUATOR AND HOUSING APERTURE

FIELD OF THE DISCLOSURE

The present disclosure relates generally to electrical load control devices, and more particularly to electrical load control devices incorporating a mechanical actuator accessible within an opening formed in a front surface of the electrical device, the electrical device incorporating one or more protrusions, geometries, surface features, spacers, or the like to provide a uniform gap or space between the mechanical actuator and the interior edges of the opening formed in the front surface of the electrical load control device (e.g., a paddle or push-button actuator).

BACKGROUND OF THE DISCLOSURE

Generally speaking, electrical devices such as, for example, electrical switches, dimmer switches, occupancy sensors incorporating a manual switch, a mechanical actuator, etc. (terms used interchangeably herein without the intent to limit or distinguish) include a housing for enclosing electrical circuitry for powering, controlling, operating, etc. the device, a mounting plate to attach the electrical device to a standard electrical wall box, and one or more mechanical actuators such as, for example, a pushbutton switch, a paddle switch, or the like, to toggle or adjust a load such as, for example, a lighting load, ON and OFF.

One common problem associated with electrical devices incorporating a mechanical actuator is that maintaining a consistent gap or spacing between an outer surface of the mechanical actuator and the inner surfaces or interior edges (terms used interchangeably herein without the intent to limit or distinguish) of the opening formed in the front surface or housing can be a challenge. Providing a consistent gap between surfaces results in an aesthetically pleasing appearance and ensures that the mechanical actuator doesn't bind or contact the inner surfaces of the opening when the mechanical actuator is operated. One solution to this problem is to provide extremely tight tolerances on the associated pieces, however this adds to the challenge of manufacturing and/or assembling such pieces.

Thus, it would be beneficial to provide an easy to implement solution to provide a consistent gap between the outer surface of the mechanical actuator and the inner surface of the opening formed in the front cover or housing thereby easing manufacturability while ensuring improved aesthetics and proper functionally of the electrical load control device.

It is with respect to these and other considerations that the present improvements may be useful.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is an electrical load control device including, in one example embodiment, a housing, a front cover, and one or more mechanical actuators manually actuatable to manipulate a load such as, for example, a lighting load, to turn the load ON and OFF. In accordance with one or more aspects of the present disclosure, the electrical device includes one or more protrusions, geometries, surface features, or spacers positioned within an opening formed in the front cover for receiving the mechanical actuator. During use, the protrusions, geometries, surface features, or spacers are arranged and configured to interact with the mechanical actuator of the electrical device to position and/or align the mechanical actuator within the opening to maintain a consistent and uniform gap or spacing between an outer surface of the mechanical actuator and an inner surface of the opening formed in a front surface of the device.

In one embodiment, an electrical device is disclosed. The electrical device including a housing including a front surface, the front surface having an aperture formed therein; a line terminal disposed at least partially within the housing, the line terminal configured to be electrically coupled to an alternating current (AC) power source; a load terminal disposed at least partially within the housing, the load terminal configured to be coupled to an electrical load; a switching circuit including a controllably conductive switch in series electrical connection between the line terminal and the load terminal, wherein the controllably conductive switch is configured to alter an electrical characteristic of power delivered to the electric load; a switch in electrical communication with the switching circuit, the switch configured to be mechanically engaged and to communicate a switching signal to the switching circuit; and a floating mechanical actuator moveable between a rest position and a depressed position, the mechanical actuator being user accessible via the aperture, wherein the mechanical actuator is arranged and configured to mechanically engage the switch in the depressed position; wherein when the switch is engaged by the mechanical actuator, the switching circuit controls the controllably conductive switch to alter the electrical characteristic of the power delivered to the electric load; and wherein the housing includes a plurality of protrusions protruding into the aperture, the plurality of protrusions arranged at a plurality of locations along an inner surface of the aperture and configured to contact the mechanical actuator in at least the rest position such that a consistent gap between an outer perimeter of the mechanical actuator and the inner surface of the aperture is maintained.

In one embodiment, the electrical characteristic of the power delivered to the electric load is one or more selected from the group consisting of: coupling electrical power to the load, decoupling power to the load, or changing the amount of power to the load from a first non-zero magnitude to a second non-zero magnitude.

In one embodiment, the switch further comprises a plurality of switches, wherein when at least one of the plurality of switches are engaged by the mechanical actuator, the controllably conductive switch alters the same electrical characteristic of the power delivered to the electric load.

In one embodiment, the protrusion includes a plurality of protrusions, each of the plurality of protrusions positioned in a corner of the aperture.

In one embodiment, the plurality of protrusions are arranged and configured to position the mechanical actuator relative to the aperture.

In one embodiment, the plurality of protrusions are arranged and configured to position a lateral position of the mechanical actuator relative to the aperture and a longitudinal position of the mechanical actuator relative to the aperture.

In one embodiment, the plurality of protrusions are arranged and configured to position a depth position of the mechanical actuator relative to the aperture.

In one embodiment, the aperture includes first, second, third, and fourth corners, the plurality of protrusions including first and second protrusions positioned at first and second corners, respectively.

In one embodiment, the first corner and the second corner are opposing corners of the aperture.

In one embodiment, the first corner and the second corner are joined by one side of the aperture.

In one embodiment, the aperture includes first, second, third, and fourth corners, the plurality of protrusions including first, second, third and fourth protrusions positioned at first, second, third, and fourth corners, respectively.

In one embodiment, one of the first position and the second position of the mechanical actuator is a rest position, and the other of the first position and the second position is a stressed position, and the mechanical actuator is biased to return to its rest position.

In one embodiment, the protrusion includes a generally triangular cross-section.

In one embodiment, the protrusion is integrally formed with a front cover of the device.

In one embodiment, the protrusion includes one of a projection and a recess associated with the mechanical actuator and the other one of a projection and a recess associated with the housing, the recess including tapered walls for interacting with the projection to position the projection relative to the recess.

In one embodiment, interaction of the projection with the tapered walls of the recess positions the mechanical actuator relative to the device in one of a lateral direction, a longitudinal direction, or a combination thereof.

In one embodiment, an electrical device is disclosed. The electrical device including a mounting plate arranged and configured to couple to a standard electrical wall box. The electrical device further including a housing including a front surface and a rectangular aperture formed in the front surface; and a floating mechanical actuator moveable between a first position and a second position, the mechanical actuator being accessible via the aperture formed in the front surface of the device; wherein the housing includes first and second protrusions protruding into the aperture formed in the front surface, the first and second protrusions arranged and configured to interact with the mechanical actuator to position a lateral position of the mechanical actuator relative to the aperture and a longitudinal position of the mechanical actuator relative to the aperture to maintain a consistent gap between an outer perimeter of the mechanical actuator and an inner surface of the aperture.

In one embodiment, the electrical device, further includes third and fourth protrusions protruding into the aperture formed in the front surface.

In one embodiment, the first and second protrusions are integrally formed with a front cover of the device.

BRIEF DESCRIPTION OF THE DRAWINGS

By way of example, a specific embodiment of the disclosed device will now be described, with reference to the accompanying drawings, in which:

FIG. 4A is an exploded front perspective view of the electrical device shown in FIG. 1;

Figure 1:
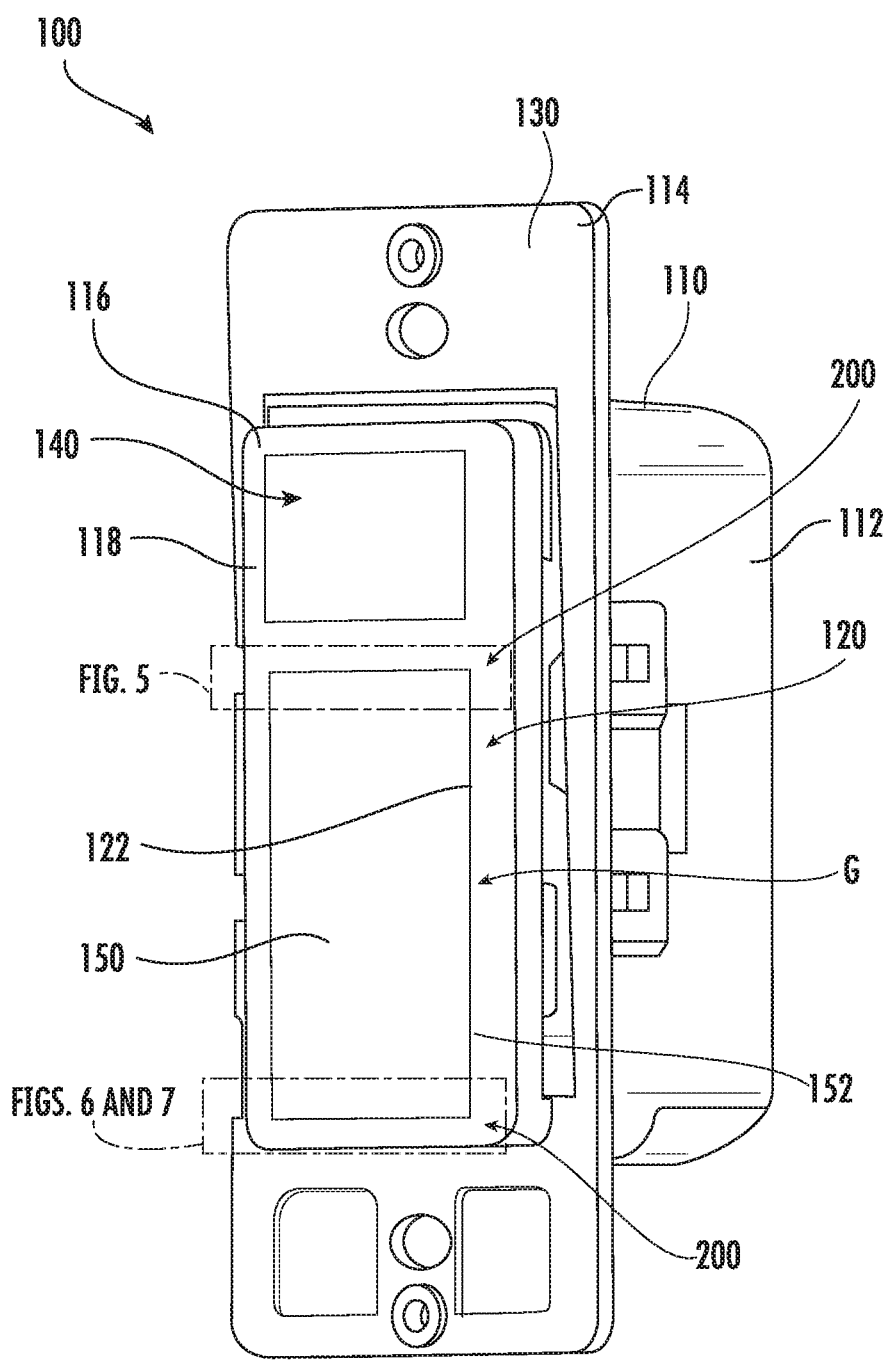
FIG. 1 is a perspective view of an example embodiment of an electrical device according to the present disclosure, the electrical device including one or more protrusion, geometries, surface features, or spacers in accordance with one or more aspects of the present disclosure.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

DETAILED DESCRIPTION

Numerous embodiments of a gap control system, device, method, etc. for use with an electrical load control device to maintain a consistent gap or spacing between an outer surface or perimeter of a mechanical actuator and an inner surface of an opening formed in a front surface of the electrical load control device (e.g., the opening may be arranged and configured to enable the mechanical actuator to be accessible therethrough) will now be described more fully hereinafter with reference to the accompanying drawings, in which preferred embodiments of the present disclosure are presented. The gap control system of the present disclosure may, however, be embodied in many different forms and should not be construed as being limited to the embodiments set forth herein. Rather, these embodiments are provided so that this disclosure will convey certain example aspects of the gap control system to those skilled in the art.

As will be described in greater detail below, in various embodiments, an electrical load control device arranged and configured to turn a load such as, for example, a lighting load, ON and OFF (or adjust an intensity thereof) will be described. In use, the electrical device may be any suitable now known or hereafter developed device including a mechanical actuator. For example, the electrical load control device could be an electrical switch, an occupancy sensor, a dimmer, a fan speed control, etc. In addition, the mechanical actuator may be any now known or hereafter developed mechanical actuator moveable between a first or rest position and a second or activated/depressed position (e.g., also referred to as a stress position), and can be configured to operate in any manner. For example, the mechanical actuator could be a pushbutton switch, a paddle switch, a tactile switch, a return-to-neutral switch (e.g., a return-to-neutral switch is a switch that utilizes a biasing force (e.g., a spring) to bias the switch back to its neutral (e.g., first or rest) position), a wired switch (e.g., a switch that is hardwired to the load), a wireless switch, etc. As will be described in greater detail below, in one embodiment, the mechanical actuator may be a floating, or captive, actuator (e.g., a paddle or the like that is not rigidly/fixedly pivoted/hinged). Moreover, in use, the load may be any load now known or hereafter developed. For example, the load may be a lighting load, a motor, etc. As such, while the present disclosure will be described in connection with an electrical device such as, for example, an occupancy sensor including a mechanical actuator to turn a lighting load ON and OFF, the present disclosure should not be limited to any particular type of device unless specifically claimed.

Figure 2:
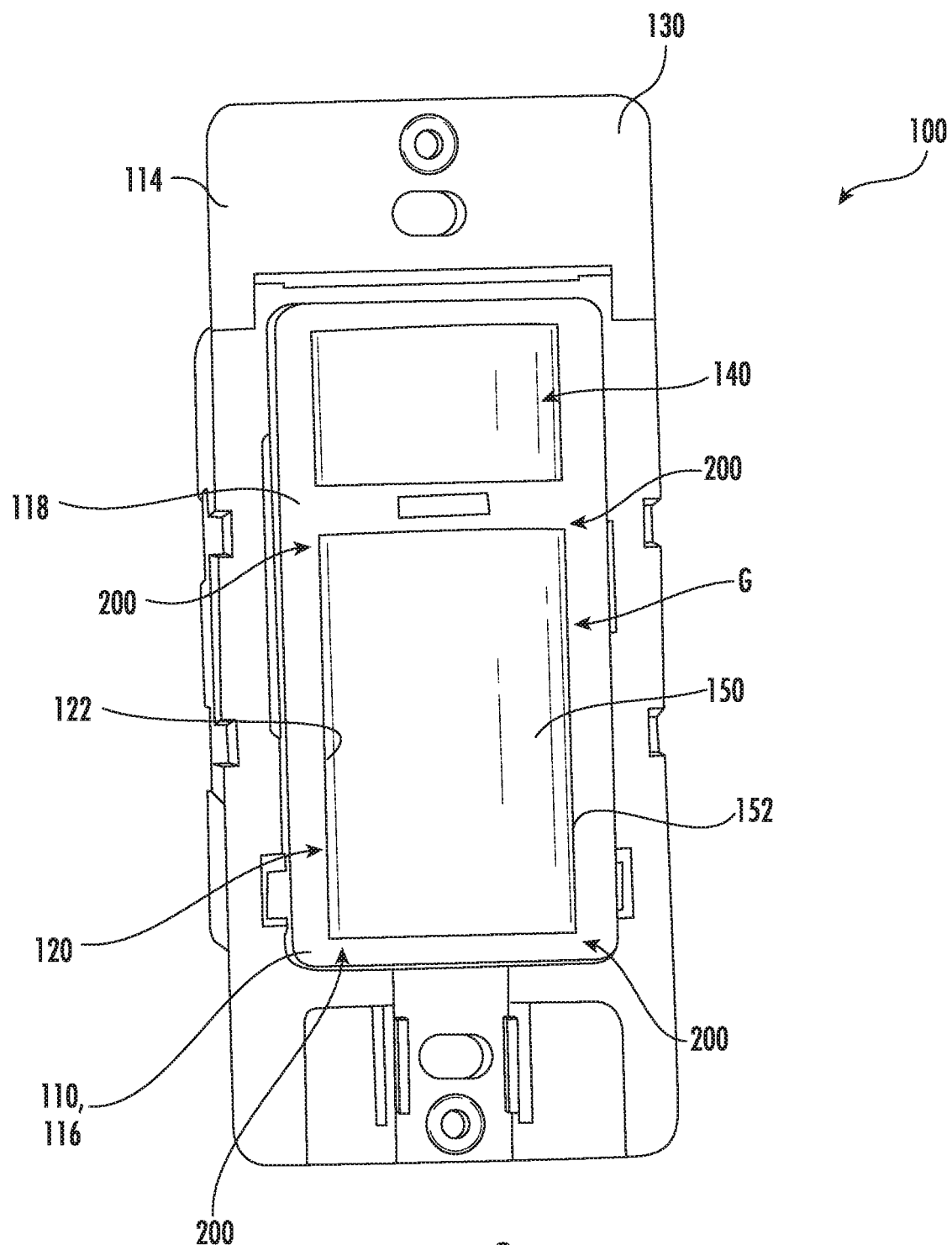
FIG. 2 is a front view of the electrical device shown in FIG. 1.
Figure 3:
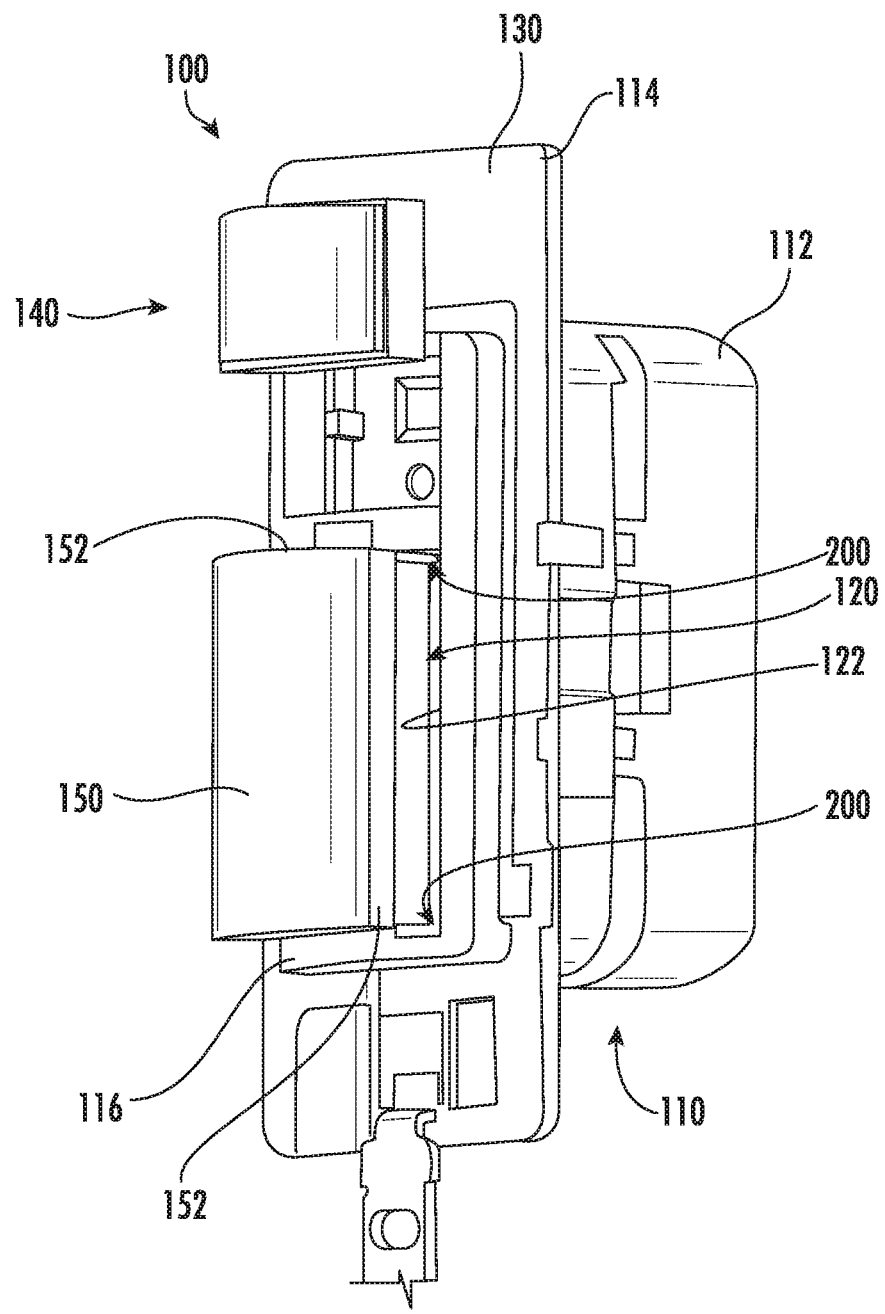
FIG. 3 is a partially exploded view of the electrical device shown in FIG. 1.

Referring to FIGS. 1-3, an exemplary electrical device 100 according to the present disclosure is shown. In use, as will be described in greater detail herein, the electrical device 100 includes one or more gap control systems, device, methods, or the like 200, to maintain a consistent gap or spacing G between an outer surface or perimeter 152 (e.g., lateral, top, and/or bottom edge or surface) of a mechanical actuator 150 and an inner surface 122 (e.g., lateral, top, and/or bottom edge or surface) of an opening 120 formed in a front surface of the device 100 (e.g., the opening 120 may be arranged and configured to enable the mechanical actuator 150 to be accessible therethrough).

Figure 4B:
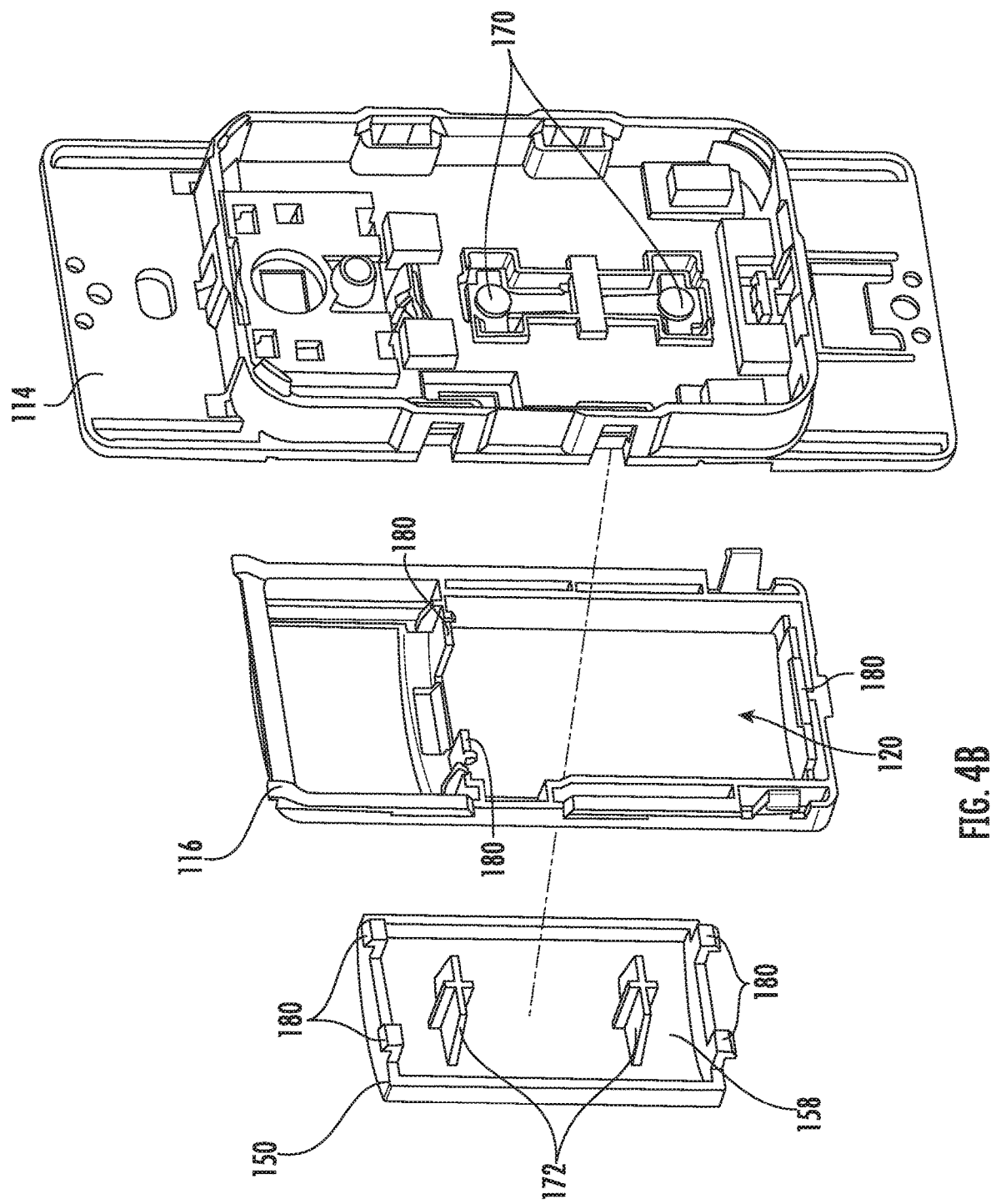
FIG. 4B is an exploded rear perspective view of the front housing portion, the front cover, and the mechanical actuator shown in FIG. 4A.

As illustrated, the electrical device 100 may include a housing 110. In one embodiment, the housing 110 may include a back housing portion 112 and a front housing portion 114. Referring to FIGS. 4A and 4B, the front housing portion 114 may include a front cover 116 defining a front surface 118 of the device 100. The front surface 118 may include an opening or aperture 120 (terms used interchangeably herein without the intent to limit or distinguish) such as, for example, a rectangular opening (e.g., opening including first, second, third, and fourth sides along with first, second, third, and fourth corners), although other shapes are envisioned.

In one embodiment, as illustrated, the electrical device 100 also includes one or more mechanical actuators 150. As will be described in greater detail below, movement, activation, manipulation, etc. of the mechanical actuator 150 from a first or rest position to a second or activated/depressed position causes the load to turn ON and OFF (or adjust the intensity thereof). In use, as will be described in greater detail below, the opening 120 is arranged and configured to receive the mechanical actuator 150 so that the mechanical actuator 150 is accessible to a user.

In use, the housing 110 of the electrical device 100 may include greater or fewer body portions such that any number of body portions may be used to form the housing 110 such as, for example, one, two, four, or more. In one embodiment, the front cover 116 and the mechanical actuator 150 may be part of a separate, removable piece such as, for example, a color changing kit. For example, the front cover 116 and the mechanical actuator 150 may be part of a bezel. As such, the term housing should be given its broadest reasonable interpretation.

Referring to FIGS. 4A and 4B, in one embodiment, the front cover 116 may be coupled to the front housing portion 114 by any suitable mechanism now known or hereafter developed such as, for example, intercoupling projections and recesses. In one embodiment, the front housing portion 114 includes first and second biasing members 170, although it is envisioned that more or less biasing members may be incorporated. In use, user activation of the mechanical actuator 150 from the first or rest position to the second or activated/depressed position causes the mechanical actuator 150 to contact the biasing members 170. For example, in one embodiment, projections 172 extending from a rear surface 158 of the mechanical actuator 150 contact the biasing members 170. In use, movement of the mechanical actuator 150 from the first or rest position to the second or activated/depressed position causes the biasing members 170 to depress, which causes contact with one or more switches 162, positioned on a PCB 160 within the housing 110 causing the load to, for example, turn ON or OFF. In use, the one or more switches 162 may be any suitable switch now known or hereafter developed including, for example, miniature snap-action switches (e.g. micro switches), non-digital switches, a contact closure switch, a single pole, single throw (SPST) switch, a single pole, double throw (SPDT) switch, etc. In use, the switch 162 can be either an indirect input to a controller to take some action (i.e., a microswitch/contact closure), or a physical switch that directly toggles the circuit on/off by toggling contacts open and closed. That is, in one embodiment, as will be readily appreciated by one of ordinary skill in the art, the user presses the mechanical actuator 150 causing the mechanical actuator 150 to move from the first or rest position to the second or depressed position, which causes the mechanical actuator 150 to contact, either directly or indirectly, at least one of the switches 162, which causes the load to TURN ON or OFF. In use, the biasing members 170 bias the mechanical actuator 150 towards the first or rest position such that when the user releases the mechanical actuator 150, the mechanical actuator 150 moves to the rest or first position. As illustrated, in one embodiment, the biasing members 170 may be in the form of leaf springs, although other configurations are envisioned. The biasing members 170 may optionally be formed integrally with the front housing portion 114.

Figure 5A:
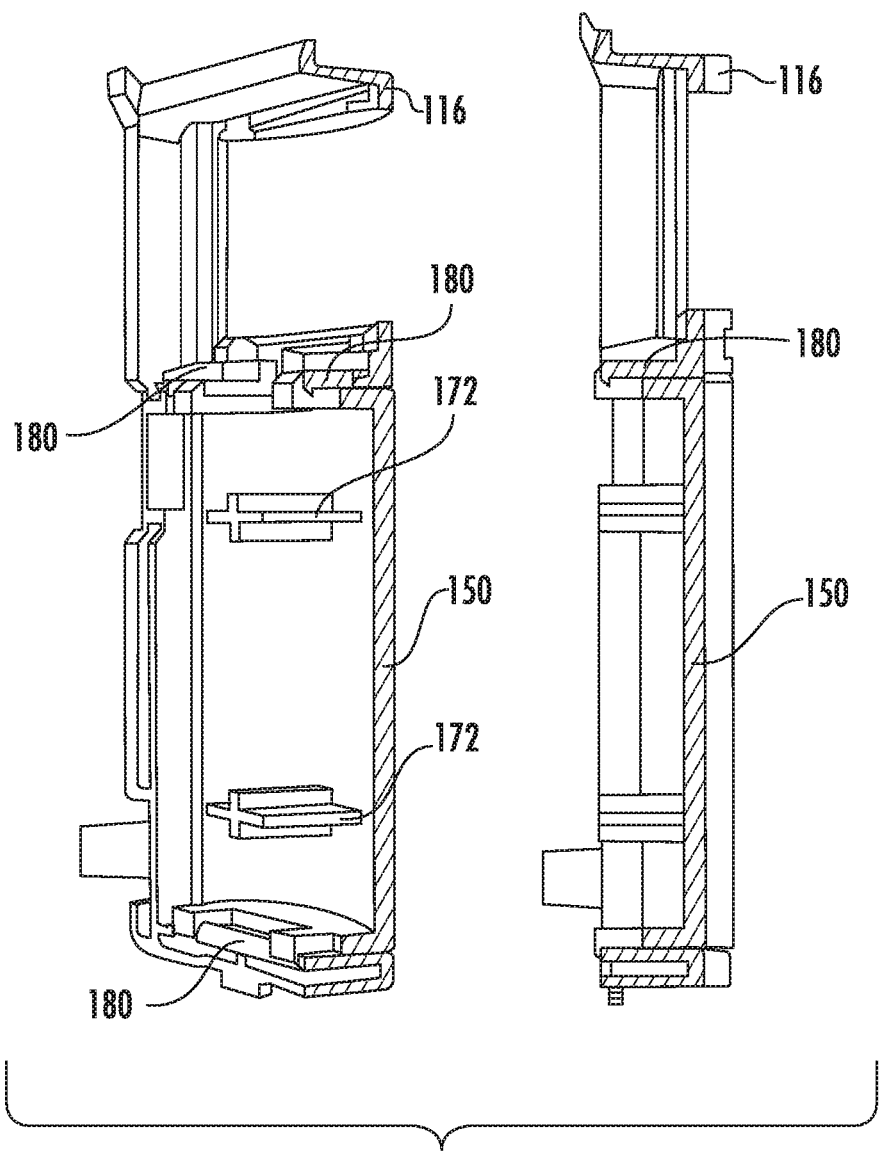
FIG. 5A illustrates various cross-sectional slices taken at a first location through the electrical device shown in FIG. 4A, the cross-sectional slices illustrating various stops formed along the front cover and the mechanical actuator to prevent the mechanical actuator from falling out and/or being over pressed.
Figure 5B:
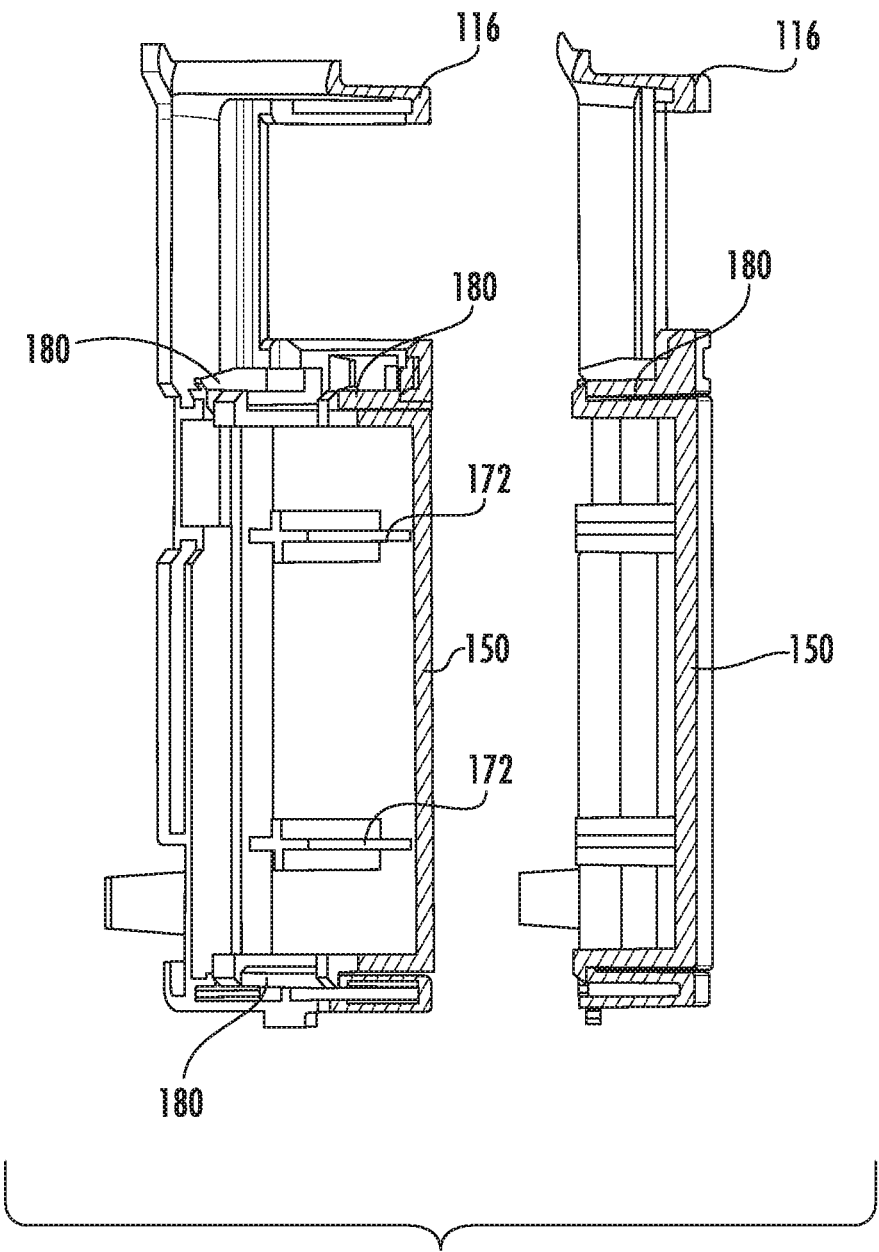
FIG. 5B illustrates various cross-sectional slices taken at a second location through the electrical device shown in FIG. 4A, the cross-sectional slices illustrating the various stops shown in FIG. 5A.

Referring to FIGS. 5A and 5B, in use, the mechanical actuator 150 may be moved from the first or rest position to the second or depressed position. In one embodiment, the mechanical actuator 150 may be arranged and configured so that the user can contact or press anywhere on the front surface of the mechanical actuator 150 and still result in the mechanical actuator 150 contacting, either directly or indirectly, one of the switches 162 to toggle the state of the device ON/OFF. In one embodiment, the mechanical actuator 150 and/or the front cover 116 include, or are operatively associated with, one or more stops 180. For example, in one embodiment, the front cover 116 includes one or more stops 180 to prevent the mechanical actuator 150 from being over-pressed, moved, etc. In addition, the mechanical actuator 150 may include one or more stops 180 to prevent the mechanical actuator 150 from passing through the opening 120 (e.g., falling out). As illustrated, in one embodiment, the stops 180 may be in the form of a hook projection extending rearwardly from the front cover 116 and/or rearwardly from the mechanical actuator 150. In one embodiment, as illustrated in FIG. 4B, the mechanical actuator 150 may include four stops 180, one positioned in each corner of the mechanical actuator 150. The front cover 116 may include two stops 180 provided along a top edge of the front cover 116 while a single larger stop 180 may be provided along a bottom edge thereof, although this is but one configuration and other configurations are envisioned.

Additionally, in one embodiment, the electrical device 100 may include a mounting plate 130 arranged and configured to attach the electrical device 100 to a standard electrical wall box. For example, the front housing portion 114 may include the mounting plate 130. In addition, in the non-limiting example embodiment shown, the electrical device 100 may also include an occupancy sensor 140 (FIGS. 1-3) arranged and configured to detect the presence of an occupant in a space to, for example, automatically turn ON and OFF the load (or adjust the intensity thereof) in response thereto.

As will be appreciated by one of ordinary skill in the art, the electrical device 100 may include additional components. For example, the electrical device 100 includes electrical circuitry associated with the mechanical actuator 150, occupancy sensor 140, etc. to receive low-voltage or line-voltage power, as well as circuitry used to control the load in response to manual activation of the mechanical actuator, detection of an occupant, etc. For example, the electrical device 100 may include line contacts or terminals for receiving line voltage (e.g., a line terminal configured to be electrically coupled to an alternating current (AC) power source), load contacts or terminals for connecting to the load (e.g., a load terminal configured to be coupled to an electrical load), and ground contacts or terminals. In use, the contacts or terminals may be any suitable form now known or hereafter developed including, for example, screw terminals, leads, etc. In addition, the electrical device 100 may include one or more PCBs 160 including one or more switches 162 for contacting with the mechanical actuator 150, etc.

Figure 4C:
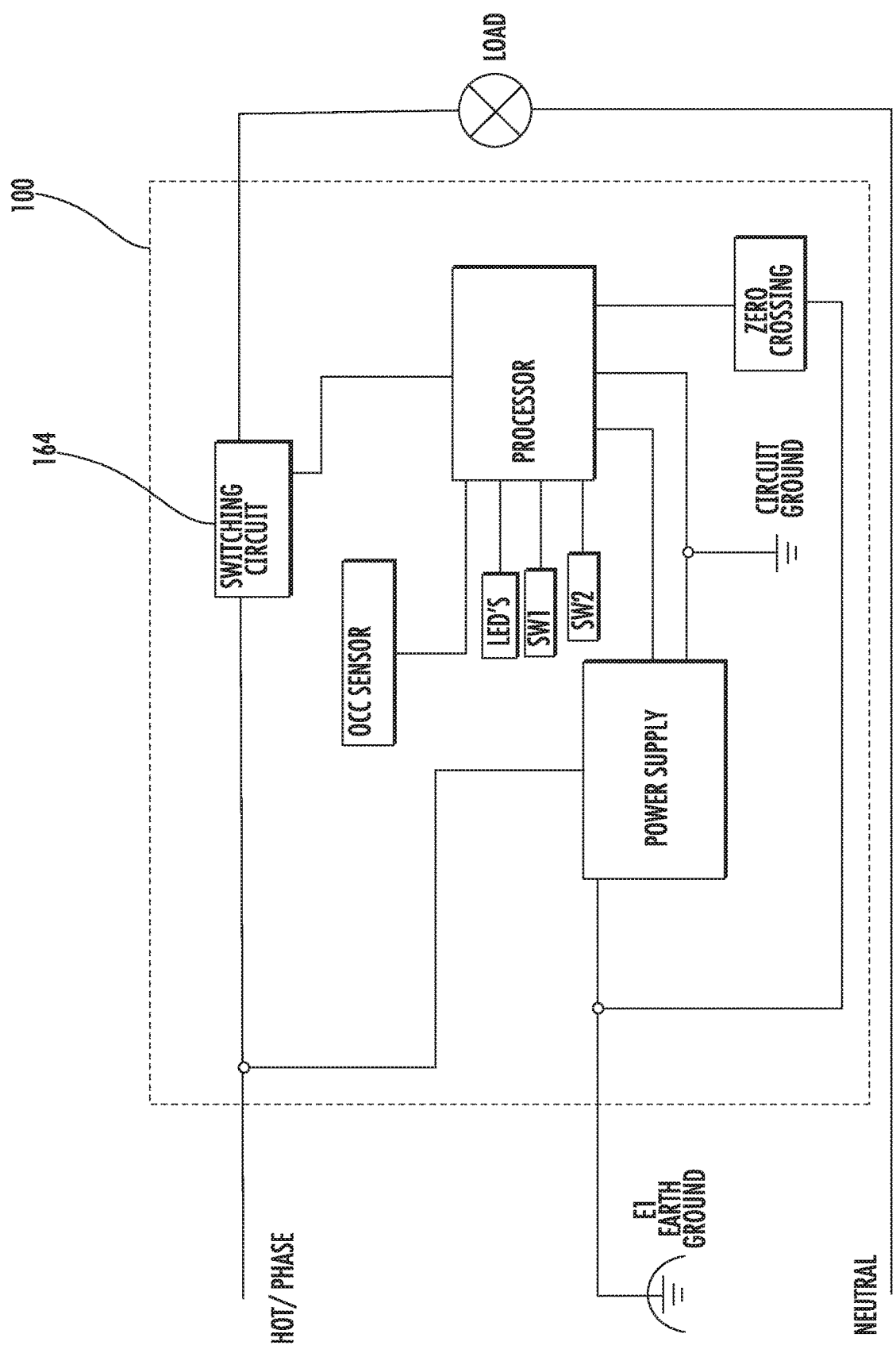
FIG. 4C is a schematic layout of the electrical device shown in FIG. 1.

As will be readily appreciated by one of ordinary skill in the art, the electrical device 100 includes a switching circuit. For example, in one embodiment, referring to FIG. 4C, the electrical device 100 includes a switching circuit 164. In use, the switching circuit 164 includes a controllably conductive switch in series electrical connection between the line terminal and the load terminal. The controllably conductive switch is arranged and configured to alter an electrical characteristic of power delivered to the electric load. In use, the switch 162 such as, for example, a micro-switch positioned on a PCB 160, is in electrical communication with the switching circuit. The switch 162 is arranged and configured to be mechanically engaged by the mechanical actuator 150 and to communicate a switching signal to the switching circuit. In use, when the mechanical actuator 150 is moved from the rest position to the depressed position, the mechanical actuator 150 engages the switch 162 causing the switching circuit to control the controllably conductive switch to alter the electrical characteristic of the power delivered to the electric load.

In addition, the electrical device 100 may also include a plurality of LEDs to, for example, provide indication of lighting level, location, ON/OFF status, etc. However, since general operation and configuration of electrical devices is well known in the art and not the subject of the present disclosure, such information is omitted for the sake of brevity of the present disclosure.

In accordance with one or more aspects of the present disclosure, the electrical device 100 includes a gap control system, device, method, or the like 200 to maintain a uniform and consistent gap or spacing G between the outer surface or perimeter 152 (e.g., lateral, top, and/or bottom edge or surface) of the mechanical actuator 150 and the inner surface or perimeter 122 (e.g., lateral, top, and/or bottom edge or surface) of the opening 120 formed in the front surface 118 of the device 100. That is, as previously discussed, maintaining a consistent gap or spacing G between the outer surface or perimeter of the mechanical actuator and the inner surface of the front cover can be a challenge to manufacture. However, improper (i.e., uneven, too narrow, too wide) gaps or spacing G can lead to unpleasant aesthetics and in extreme situations, improper functioning of the mechanical actuator. One typical solution is to provide extremely tight tolerances on the associated pieces, which complicates manufacturing, and adds time and cost.

In accordance with one or more aspects of the present disclosure, finite, discrete protrusions, geometries, surface features, or spacers 202 (FIGS. 6-9B) may be utilized to provide a uniform and consistent gap or spacing G between the outer surface or perimeter 152 of the mechanical actuator 150 and the inner surface or perimeter 122 of the opening 120 formed in the front surface 118 of the device 100. Moreover, as will be described in greater detail below, by providing finite discrete protrusions, geometries, surface features, or spacers 202, tolerance of the device 100 need only be maintained in the areas surrounding the protrusions, geometries, surface features, or spacers 202 thereby easing manufacturing requirements. As will be shown and described, in one embodiment, the finite discrete protrusions, geometries, surface features, or spacers 202 may be in the form of a tapered protrusion (terms protrusions, geometries, surface features, or spacers are used interchangeably herein without the intent to limit or distinguish).

Referring to FIGS. 6-9B, in one embodiment, the electrical device 100 includes one or more spacers 202. That is, in one embodiment, the electrical device 100 may include one or more spacers such as, for example, one or more integrally formed or discrete spacers to interact with, guide, or the like, the mechanical actuator 150 within the opening 120 formed in the electrical device 100 to provide a uniform gap or spacing G. That is, because of the floating nature of the mechanical actuator 150, one or more spacers 202 are provided within the opening 120 formed in the electrical device 100 to provide a uniform gap or spacing G between the outer perimeter 152 of the mechanical actuator 150 and the inner surface 122 of the opening 120.

As illustrated, the spacers 202 may be positioned on the front cover 116 of the device 100. During use, the spacers 202 are arranged and configured to protrude into the opening 120 formed in the front surface 118. During movement, activation, manipulation, etc. of the mechanical actuator 150, the spacers 202 interact with, contact, or the like, the mechanical actuator 150 to guide the mechanical actuator 150 relative to the opening 120 to ensure a consistent and uniform gap or spacing G as the mechanical actuator 150 moves between the first and second positions. That is, in one embodiment, the spacers 202 interact with, contact, or the like, the mechanical actuator 150 to center the mechanical actuator 150 within the opening 120 to ensure a consistent and uniform gap or spacing G between the outer surface or perimeter 152 of the mechanical actuator 150 and the inner surface 122 of the opening 120.

Figure 7:
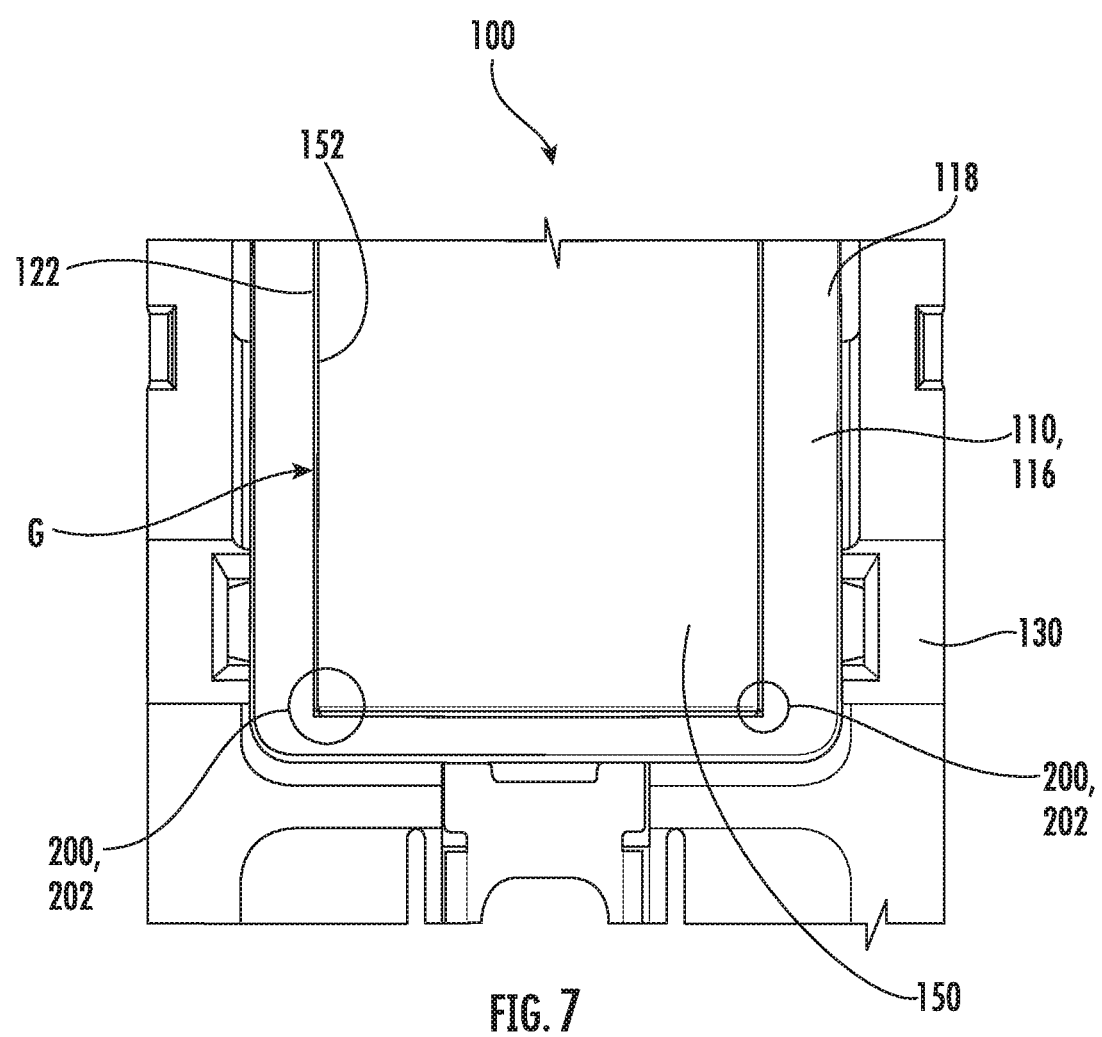
FIGS. 7 and 8 are detailed views of the protrusions, geometries, surface features, or spacers illustrated in the bottom corners of the opening formed in the device.
Figure 8:
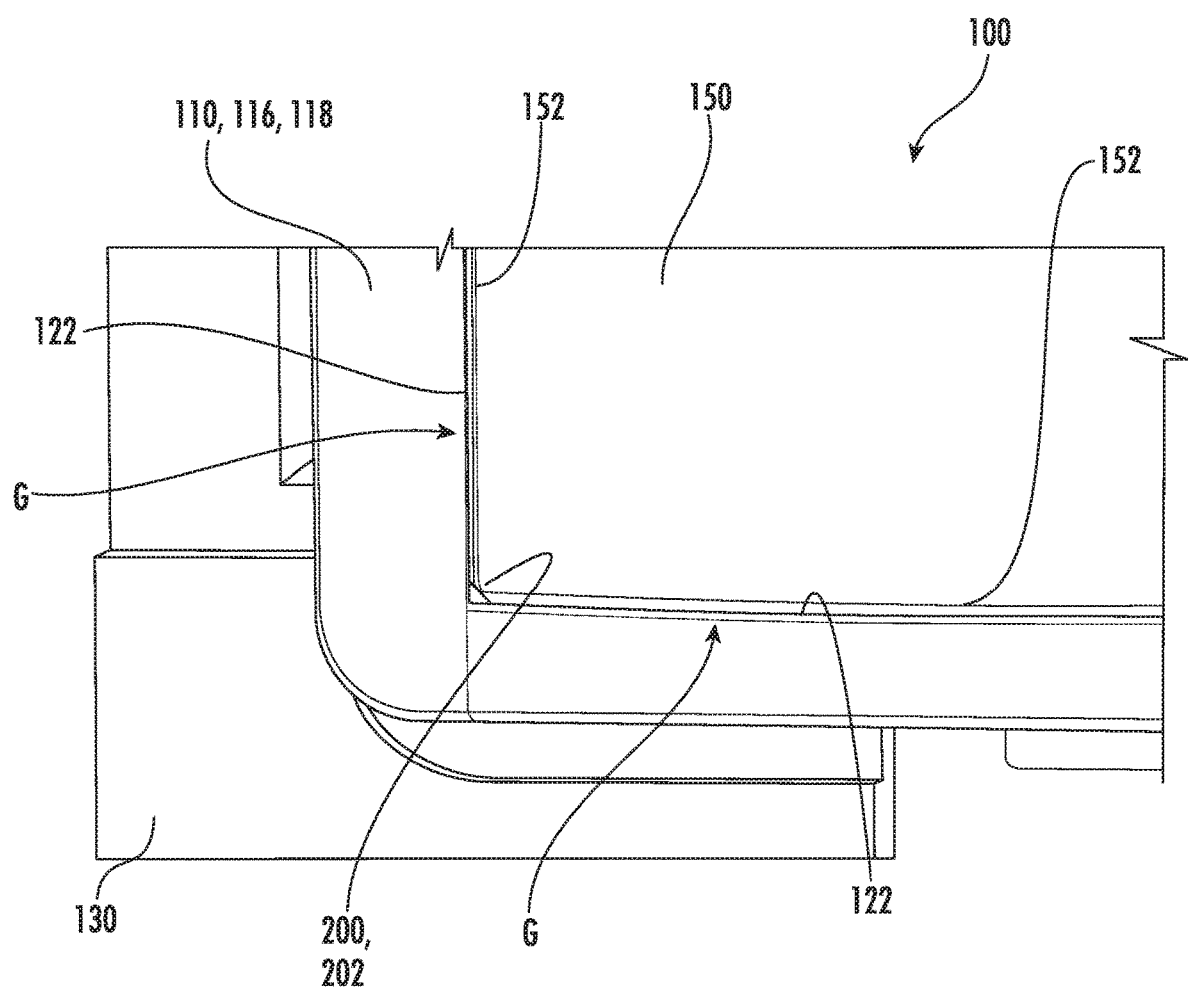

As illustrated, in one embodiment, the spacers 202 may be positioned within the corners of the opening 120. That is, as illustrated, the rectangular-shaped opening includes first, second, third, and fourth corners (e.g., a top left corner, a top right corner, a bottom left corner, and a bottom right corner). By positioning the spacers 202 in one or more of the corners of the opening 120, the spacers 202 are positioned to maintain the mechanical actuator in a desired lateral (e.g., X-direction), longitudinal (e.g., Y-direction), and/or the depth (e.g., Z-direction) position, as will be described in greater detail below. That is, positioning the spacers 202 in one or more of the corners of the opening 120 enables the spacers 202 to maintain a desired positioning of the mechanical actuator 150 while limiting the number of locations in which high tolerances of the device 100 need to be maintained. In one embodiment, as illustrated in FIGS. 6-8, the device 100 may include first, second, third, and fourth spacers 202 positioned in the first, second, third, and fourth corners.

Figure 6:
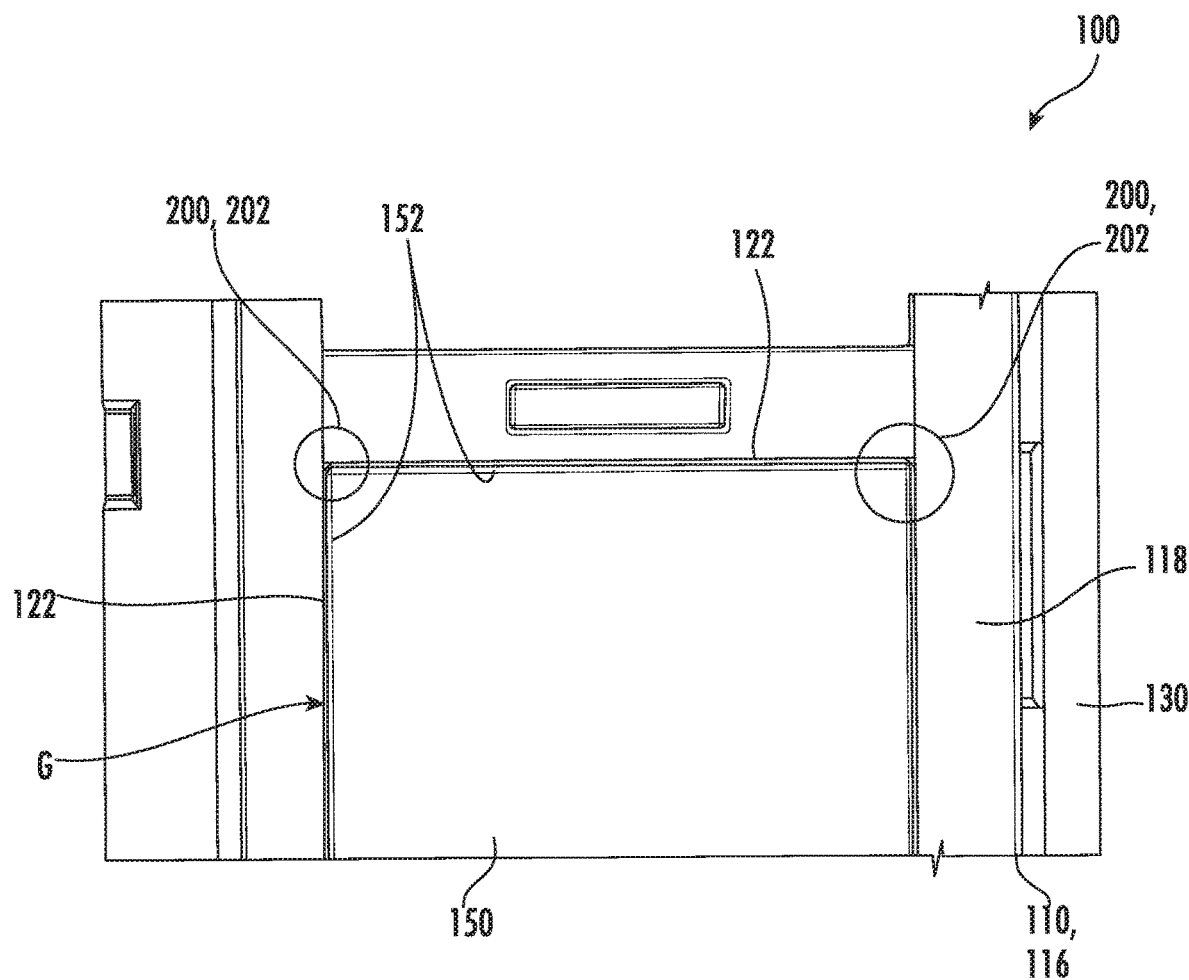
FIG. 6 is a detailed view of an example embodiment of the protrusions, geometries, surface features, or spacers of the present disclosure, the geometries, surface features, or spacers illustrated in the top corners of the opening formed in the device.

For example, as illustrated, in FIG. 6, the spacers 202 may be positioned on the front cover 116 of the device 100, in the top left corner and the top right corner of the opening 120 formed in the front surface 118 of the device 100. In addition, and/or alternatively, as illustrated, in FIGS. 7 and 8, the spacers 202 may also be positioned on the front cover 116 of the device 100, in the bottom left corner and the bottom right corner of the opening 120 formed in the front surface 118 of the device 100.

Figure 9A:
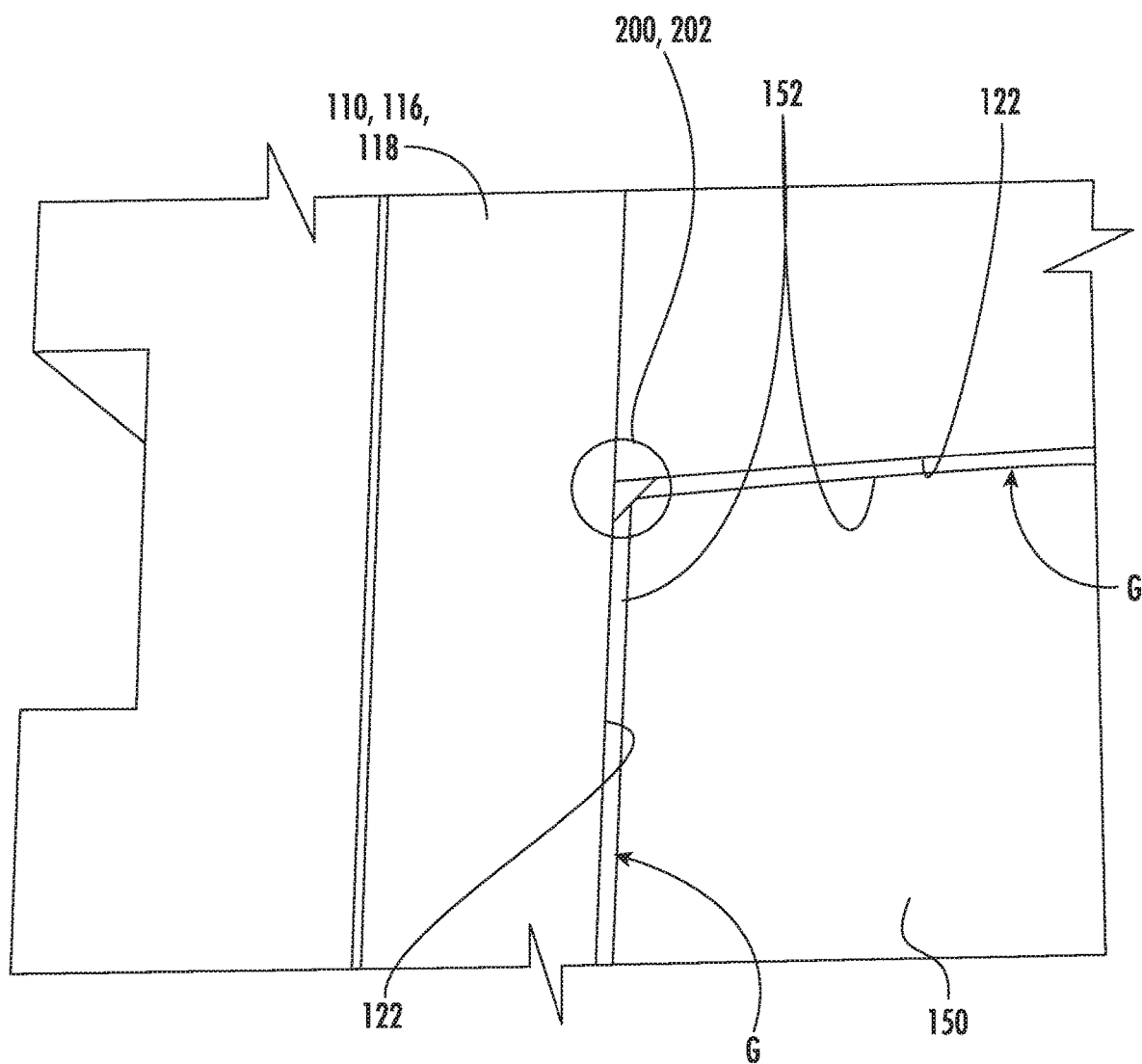
FIGS. 9A and 9B are detailed views of the protrusions, geometries, surface features, or spacers shown in FIGS. 6-8.
Figure 9B:
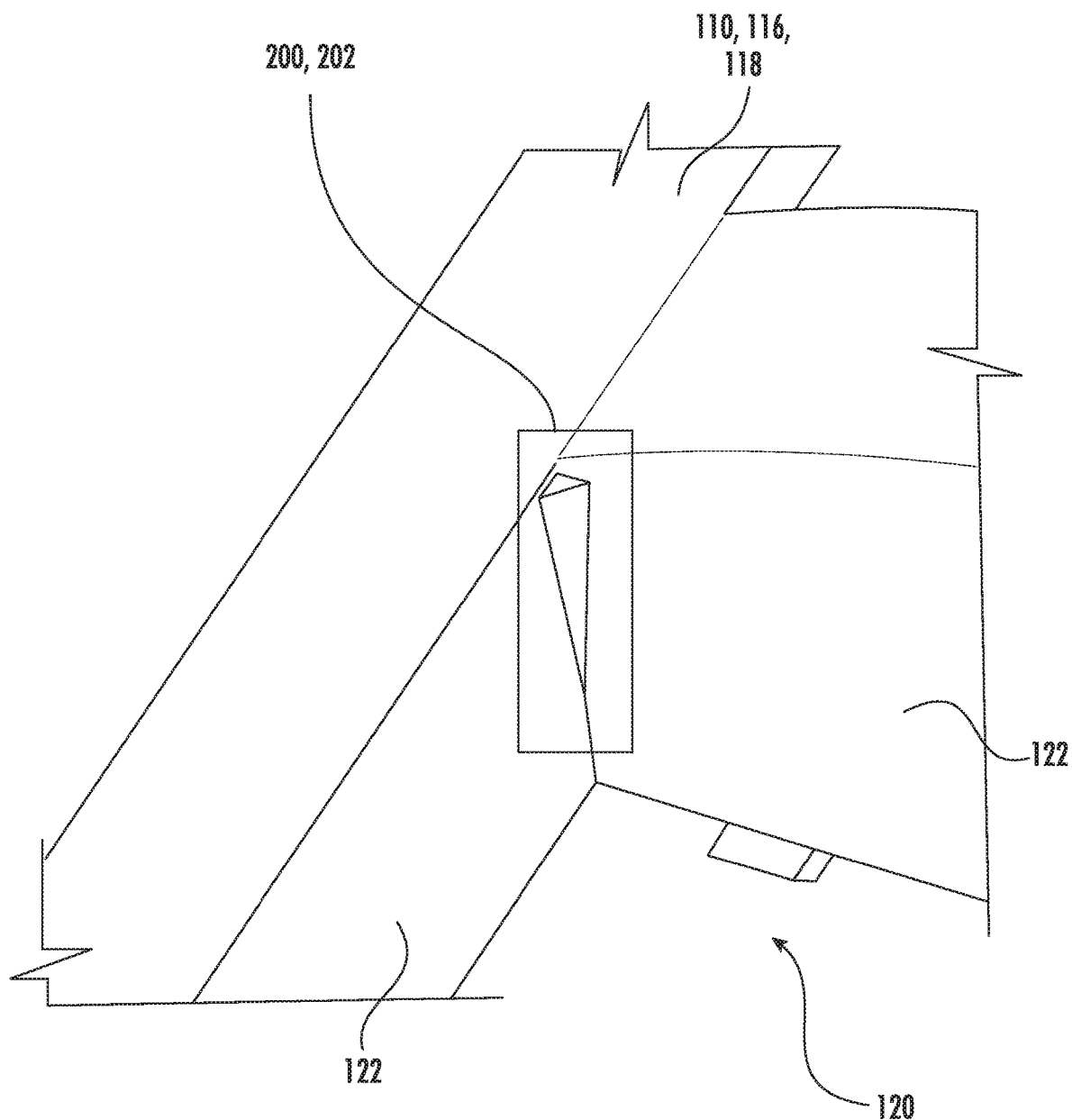

Alternatively, and/or in addition, as illustrated in FIGS. 9A and 9B, the spacers 202 may also be tapered or angled so that interaction with the mechanical actuator 150 also maintains alignment of the mechanical actuator 150 with the front surface 118 of the device 100 in the Z-direction (e.g., rotational motion of the mechanical actuator 150 in the Z-direction can be controlled).

While the present embodiments illustrate spacers 202 positioned in top and bottom corners of the opening 120 formed in the front surface 118 of the device 100, it will be appreciated that such is not required and that other configurations are envisioned. For example, in one embodiment and as previously mentioned, four spacers 202 may be utilized, one in each corner. Alternatively, in one embodiment, two spacers 202 may be positioned in top or bottom corners only (e.g., a first spacer 202 positioned in the top right corner and a second spacer 202 positioned in the top left corner, or a first spacer 202 positioned in the bottom right corner and a second spacer 202 positioned in the bottom left corner). Alternatively, in one embodiment, two spacers 202 may be positioned in opposite corners (e.g., a first spacer 202 positioned in the top right corner and a second spacer 202 positioned in the bottom left corner, or a first spacer 202 positioned in the top left corner and a second spacer 202 positioned in the bottom right corner). Alternatively, in alternate embodiments, it is envisioned that the spacers 202 may not be positioned in the corners but rather along the edges of the opening 120 formed in the front surface 118 of the device 100.

During use, regardless of the configuration, the number of spacers 202, the positioning of the spacers 202, etc., the interaction between the mechanical actuator 150 and the spacers 202 maintains a desired position of the mechanical actuator 150 relative to the opening 120. For example, interaction between the mechanical actuator 150 and the spacers 202 centers the mechanical actuator 150 relative to the opening 120. In one embodiment, interaction between the mechanical actuator 150 and the spacers 202 maintains lateral (e.g., X direction) and longitudinal (e.g., Y direction) alignment of the mechanical actuator 150 relative to the opening 120. In addition, as previously mentioned, by tapering or angling the spacers 202, interaction between the mechanical actuator 150 and the spacers 202 may also align the mechanical actuator 150 relative to the front surface 118 in the Z-direction (e.g., the front surface of the mechanical actuator 150 aligns with, is coplanar with, etc. the outer surface of the front surface 118). Thus arranged, a consistent gap or spacing G between the outer surface or perimeter 152 of the mechanical actuator 150 and the inner surface of the opening 120 formed in the front surface 118 can be obtained.

By incorporating and arranging one or more spacers 202 in the corners of the opening 120 formed in the front surface 118 of the device 100 to interact with the mechanical actuator 150, the mechanical actuator 150 can be auto-centered. For example, in connection with a return to neutral switch, wherein after manipulation of the mechanical actuator 150 by a user, the mechanical actuator 150 is arranged and configured to return to its first or rest position (e.g., mechanical actuator 150 is biased to return to its first or rest position as previously described). Upon returning to its first or rest position, the spacers 202 positioned on the front cover 116 of the device 100 are arranged and configured to position (e.g., center) the mechanical actuator 150 within the opening 120 formed in the front surface 118 of the device 100 thereby providing a consistent gap or spacing G between the mechanical actuator 150 and the front cover 116 of the device 100. That is, placing spacers 202 such as, for example, angled spacers, at the corners of the opening 120 formed in the front surface 118 of the device 100 auto-centers the mechanical actuator 150 within the opening 120. In addition, during use, the mechanical actuator 150 is freely moveable within the opening 120 formed in the front cover 116 of the device 100 such that when the mechanical actuator 150 is pressed by a user, the spacers 202 do not interfere with actuation of the mechanical actuator 150. In some embodiments, the spacers 202 are arranged and configured to only interact with the mechanical actuator 150 during its final travel to ensure a consistent and uniform gap or spacing G relative to the front cover 116. As such, the mechanical actuator 150 and front cover 116 are arranged and configured to behave as a harmonized system. Thus arranged, the need to manufacture the device with tight tolerances and/or the need to set the gaps or spacing with the device 100 is eliminated, thereby easing manufacturability.

Referring to FIGS. 6-9B, in one embodiment, the spacers 202 may have a general triangular shape. However, other configurations are envisioned and the spacers 202 may have any suitable shape or size arranged and configured to interact with the mechanical actuator 150 to maintain the mechanical actuator 150 in a desired position within the opening 120. In addition, in one embodiment, the spacers 202 may be integrally formed with the front cover 116 of the device 100. Alternatively, however, it is envisioned that the spacers 202 may be separately formed from the front cover 116 of the device 100 and coupled thereto by any suitable method now known or hereafter developed such as, for example, via an adhesive.

Figure 10:
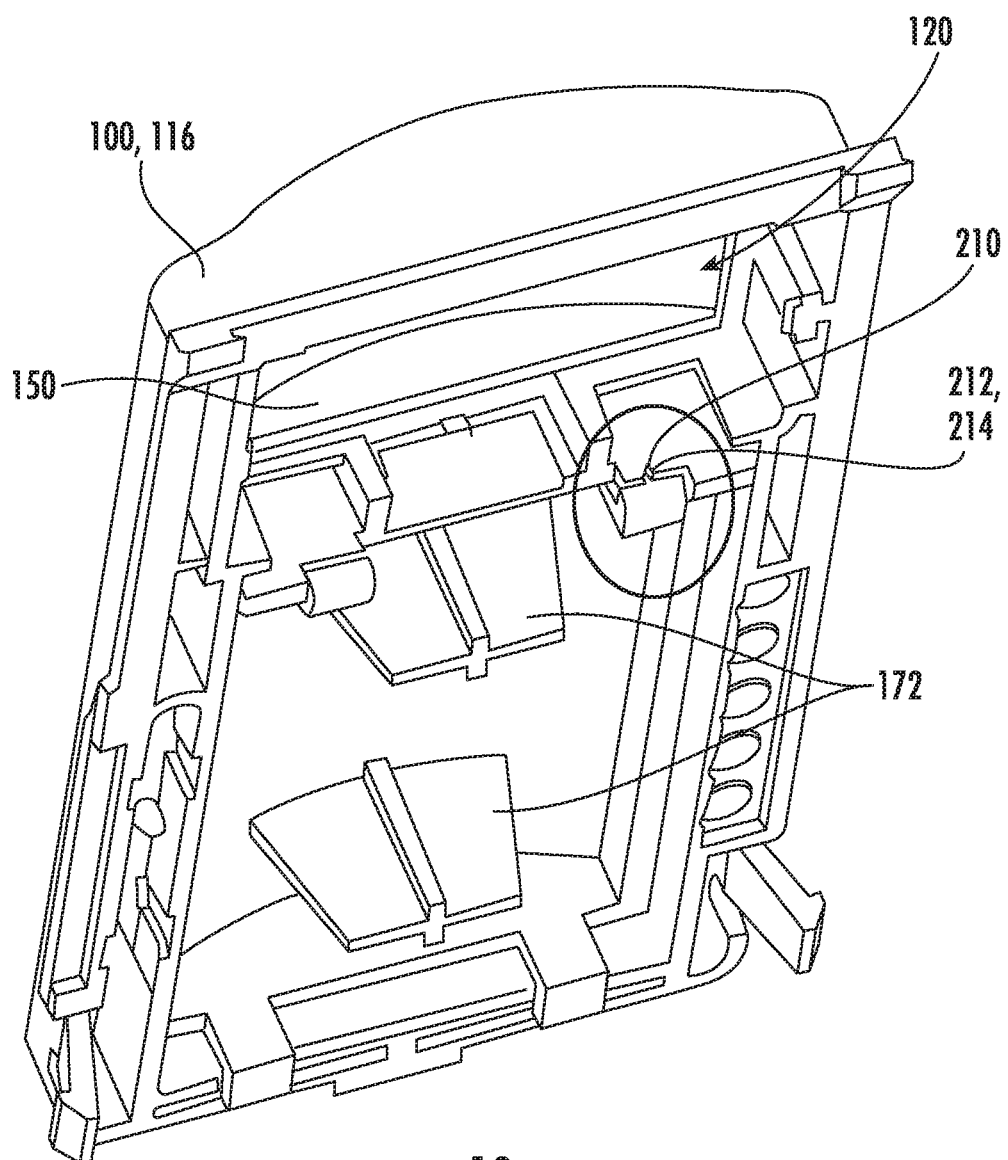
FIG. 10 is a rear perspective view of an alternate example embodiment of the geometries, surface features, or spacers of the present disclosure.

As previously mentioned, the spacers may have alternate shapes or configurations to maintain the mechanical actuator 150 in a desired position within the opening 120 of the housing. For example, referring to FIG. 10, in an alternate embodiment, the gap control system 200 intercoupling the mechanical actuator 150 and the front cover 116 of the device 100 may be in the form of one or more projections 210 and recesses 212. For example, as shown in FIG. 10, the front cover 116 may include a recess 212 and the mechanical actuator 150 may include a projection 210 arranged and configured to interact with the recess 212 so that upon returning to its first or rest position, the interaction between the projection 210 and the recess 212 centers and/or maintains the mechanical actuator 150 in a desired position within the opening 120. Alternatively, it is envisioned that the front cover 116 may include a projection 210 and the mechanical actuator 150 may include a recess 212. As illustrated, in use, the recess 212 and/or the projection 210 may be arranged and configured with angled or tapered walls 214 so that, during use, the tapered walls 214 interact with the projection 210 to guide movement or positioning of the mechanical actuator 150 relative to the front cover 116. For example, as illustrated in FIG. 10, interaction of the projection 210 and recess 212 results in lateral (e.g., X-direction) alignment.

Figure 11:
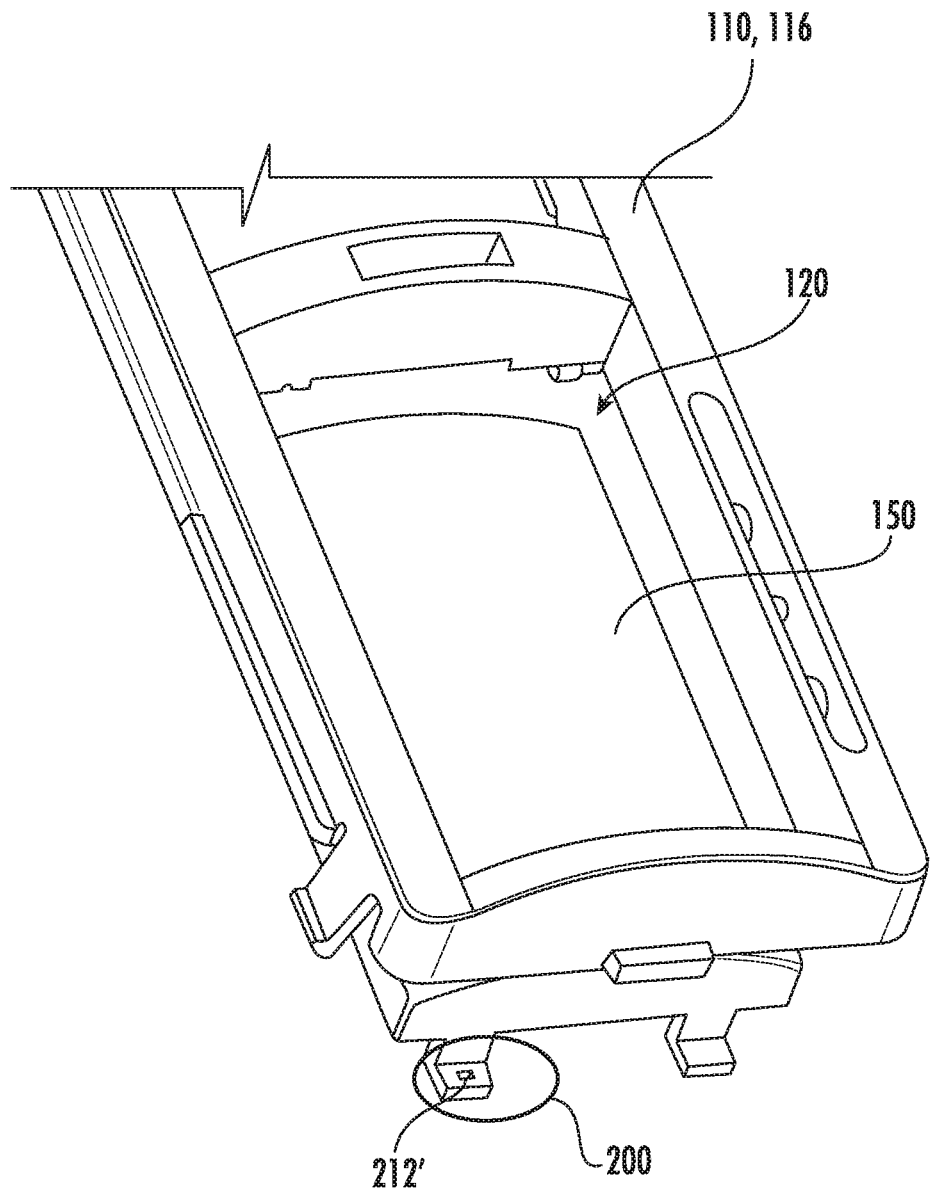
FIG. 11 is a front perspective view of an alternate example embodiment of the geometries, surface features, or spacers of the present disclosure.
Figure 12:
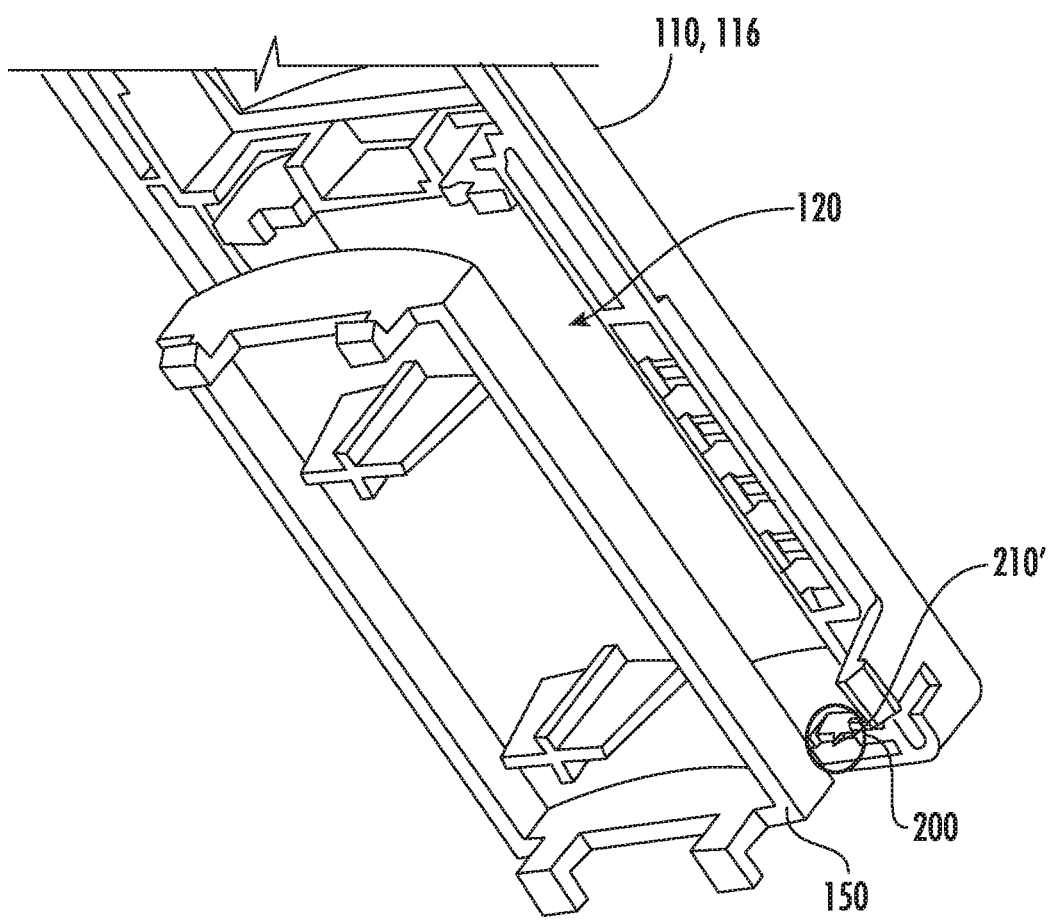
FIG. 12 is a rear perspective view of the geometries, surface features, or spacers shown in FIG. 11.

In addition, and/or alternatively, by providing another projection 210 and recess 212 orientated at a 90 degree orientation compared to the orientation shown in FIG. 10, longitudinal (e.g., Y-direction) alignment can also be obtained. Alternatively, referring to FIGS. 11 and 12, by providing, for example, a pyramid shaped projection 210' and recess 212', it is envisioned that both lateral and longitudinal alignment can be achieved (e.g., X and Y direction alignment). FIG. 11 illustrating the recess 212' formed in the mechanical actuator 150. FIG. 12 illustrating the projection 210' formed on the housing 110. As previously mentioned, it is envisioned, that the projection 210' may be formed on the mechanical actuator 150 and the recess 212' may be formed in the housing 110. In use, the projection 210' and the recess 212' are arranged and configured to interact with each other so that upon returning to its first or rest position, the interaction between the projection 210' and the recess 212' centers and/or maintains the mechanical actuator 150 in a desired position within the opening 120. As illustrated, in use, the projection 210' and the recess 212' may be arranged and configured with angled or tapered walls so that, during use, the tapered walls guide movement or positioning of the mechanical actuator 150 relative to the front cover 116 so that both lateral and longitudinal alignment can be achieved (e.g., X and Y direction alignment).

While the recess 212 was shown and described with tapered walls, it is envisioned that the projection may be formed with tapered sides for interacting with a projection have straight sides. Alternatively, it is envisioned that both the projection and the recess may be tapered.

While the present disclosure makes reference to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

What is claimed is:

1. An electrical device comprising:
   a housing including a front surface, the front surface having an aperture formed therein;
   a line terminal disposed at least partially within the housing, the line terminal configured to be electrically coupled to an alternating current (AC) power source;
   a load terminal disposed at least partially within the housing, the load terminal configured to be coupled to an electrical load;
   a switching circuit including a controllably conductive switch in series electrical connection between the line terminal and the load terminal, wherein the controllably conductive switch is configured to alter an electrical characteristic of power delivered to the electric load;
   a switch in electrical communication with the switching circuit, the switch configured to be mechanically engaged and to communicate a switching signal to the switching circuit; and
   a floating mechanical actuator moveable between a rest position and a depressed position, the mechanical actuator being user accessible via the aperture, wherein the mechanical actuator is arranged and configured to mechanically engage the switch in the depressed position;
   wherein when the switch is engaged by the mechanical actuator, the switching circuit controls the controllably conductive switch to alter the electrical characteristic of the power delivered to the electric load; and wherein the housing includes a plurality of protrusions protruding into the aperture, the plurality of protrusions arranged at a plurality of locations along an inner surface of the aperture and configured to contact the mechanical actuator in at least the rest position such that a consistent gap between an outer perimeter of the mechanical actuator and the inner surface of the aperture is maintained.

2. The electrical device of claim 1, wherein the electrical characteristic of the power delivered to the electric load is one or more selected from the group consisting of: coupling electrical power to the load, decoupling power to the load, or changing the amount of power to the load from a first non-zero magnitude to a second non-zero magnitude.

3. The electrical device of claim 1, wherein the switch further comprises a plurality of switches, wherein when at least one of the plurality of switches are engaged by the mechanical actuator, the controllably conductive switch alters the same electrical characteristic of the power delivered to the electric load.

4. The electrical device of claim 1, wherein one of the first position and the second position of the mechanical actuator is a rest position, and the other of the first position and the second position is a stressed position, and the mechanical actuator is biased to return to its rest position.

5. The electrical device of claim 1, wherein the protrusion includes a generally triangular cross-section.

6. The electrical device of claim 1, wherein the protrusion is integrally formed with a front cover of the device.

7. The electrical device of claim 1, wherein the protrusion includes one of a projection and a recess associated with the mechanical actuator and the other one of a projection and a recess associated with the housing, the recess including tapered walls for interacting with the projection to position the projection relative to the recess.

8. The electrical device of claim 7, wherein interaction of the projection with the tapered walls of the recess positions the mechanical actuator relative to the device in one of a lateral direction, a longitudinal direction, or a combination thereof.

9. The electrical device of claim 1, wherein the protrusion includes a plurality of protrusions, each of the plurality of protrusions positioned in a corner of the aperture.

10. The electrical device of claim 9, wherein the aperture includes first, second, third, and fourth corners, the plurality of protrusions including first, second, third and fourth protrusions positioned at first, second, third, and fourth corners, respectively.

11. The electrical device of claim 9, wherein the aperture includes first, second, third, and fourth corners, the plurality of protrusions including first and second protrusions positioned at first and second corners, respectively.

12. The electrical device of claim 11, wherein the first corner and the second corner are opposing corners of the aperture.

13. The electrical device of claim 11, wherein the first corner and the second corner are joined by one side of the aperture.

14. The electrical device of claim 9, wherein the plurality of protrusions are arranged and configured to position the mechanical actuator relative to the aperture.

15. The electrical device of claim 14, wherein the plurality of protrusions are arranged and configured to position a lateral position of the mechanical actuator relative to the aperture and a longitudinal position of the mechanical actuator relative to the aperture.

16. The electrical device of claim 15, wherein the plurality of protrusions are arranged and configured to position a depth position of the mechanical actuator relative to the aperture.

* * * * *